Dec. 21, 1926.                                              1,611,319
                        R. J. REANEY
                  RIM FOR AUTOMOBILE WHEELS
              Filed Jan. 28, 1925      2 Sheets-Sheet 1

INVENTOR
Russell J. Reaney
BY Harold D. Penney
HIS ATTORNEY

Dec. 21, 1926. 1,611,319
R. J. REANEY
RIM FOR AUTOMOBILE WHEELS
Filed Jan. 28, 1925    2 Sheets-Sheet 2

INVENTOR
Russell J. Reaney
BY
HIS ATTORNEY

Patented Dec. 21, 1926.

1,611,319

UNITED STATES PATENT OFFICE.

RUSSELL J. REANEY, OF OTTAWA, ONTARIO, CANADA, ASSIGNOR TO REANEY LIMITED, OF OTTAWA, CANADA.

RIM FOR AUTOMOBILE WHEELS.

Application filed January 28, 1925. Serial No. 5,405.

This present invention relates to improvements in rims for automobile wheels and appertains particularly to one that is adjustable radially to hold or loosen the tire.

An object is to provide an easier and simpler means of applying and removing automobile tires.

A further object is to provide an improved wheel requiring no removable parts to become damaged or lost when changing tires.

A still further object is to provide such a device wherein the parts are few, the construction simple and being capable of manufacture at a reasonable cost is thus rendered commercially desirable.

To the accomplishment of these and related objects my invention resides in the formation, combination and arrangement of parts as shall be hereinafter more fully described, illustrated in the accompanying drawings and pointed out in the claims hereunto appended.

Figure 1:
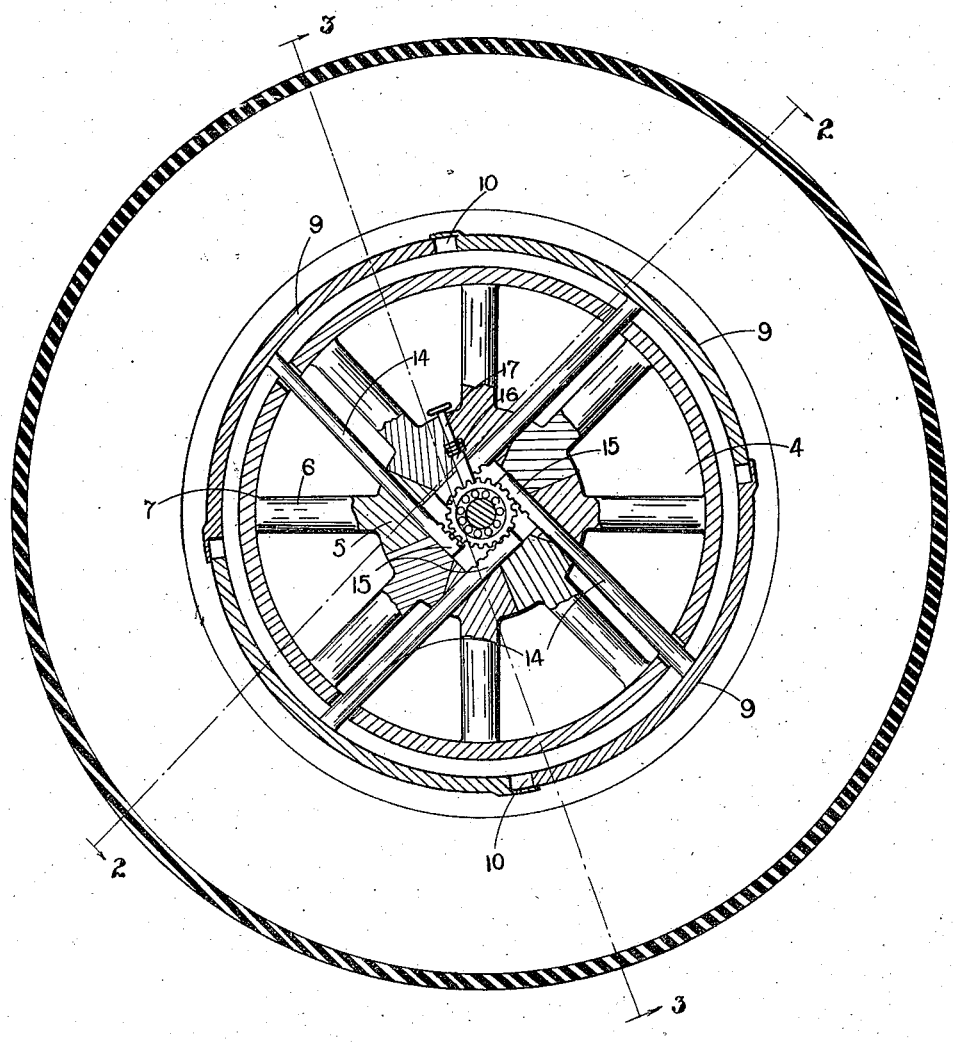
Figure 2:
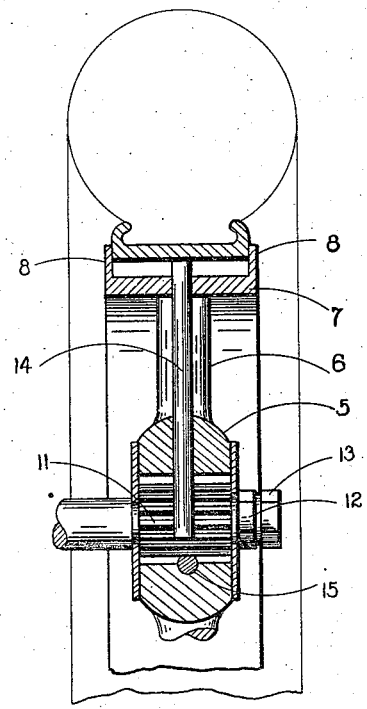
Figure 3:
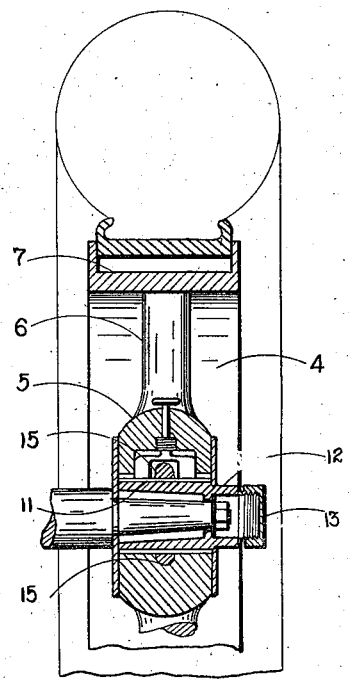

To more fully illustrate the herein disclosed invention I append drawings wherein Fig. 1 is a vertical section of my improved wheel; and Figs. 2 and 3 are fragmentary transverse sections as on lines 2—2 and 3—3 of Fig. 1.

Changing tires has always presented a question to the motorist and the automobile manufacturer and is a problem that has become continually more acute increasing daily since the advent of women drivers.

The proposition thus offered has not been met by demountable rims and the demand for improvement is more insistent than ever.

To alleviate this difficulty, I provide a wheel having a trough-like felloe in which a radially expandible rim is received. This rim is in overlapping sections and while held against lateral displacement by the walls of the felloe trough, is supported by spokes whose inner racked ends mesh with a gear axle-carried sleeve. Rotation of the said sleeve with respect to the wheel extends or retracts the rim mounted spokes and expands or contracts the rim. To apply a tire the rim is contracted to the fullest extent allowing of the placement of the tire when the gear hub or sleeve is manually rotated expanding the rim and securing the tire against lateral displacement or rotation with respect to the rim.

Referring particularly to the drawings wherein like characters designate like parts throughout the several views, 4 designates a wheel having a hub 5, spokes 6 and a felloe 7, the latter being trough-like in cross-section having side walls 8. A tire carrying rim 9 concentric with said felloe 7 is held against lateral displacement by the walls thereof and is formed in segments 9ª, 9ᵇ, 9ᶜ and 9ᵈ, with overlapping ends 10, that are adjustable radially.

The wheel 4 is applied to the axle in the usual way but a rotatable toothed sleeve 11 surrounds the bearings and projects outwardly in the form of an integral hub cap receiving flange 12 on the outer end of which the cap 13 may be threadedly applied. Arms 14 extending inwardly from the centre of each rim segment have racked inner ends 15 meshing tangentially with the toothed sleeve 11 and are well bearinged in the felloe 7 and wheel hub 5. If desired these radially movable arms may be housed within the spokes 6 thus hiding them from view, guarding them from damage and supporting them throughout practically their whole length.

A fork 16, the stem 17 of which projects radially from the wheel hub 5 straddles one of the racks 15 and is urged by a spring 18 to seat normally in said gear sleeve 11 thereby positively locking the latter against rotation with respect to the wheel 4.

In use, the stem 17 of the fork lock 16 is drawn outwardly, the sectional rim 9 is contracted by the rotation of the hub cap 12 by a conventional hub cap wrench, thus rotating the gear sleeve 11 that retracts the racked rim section arms 14. Following the application of the tire, the rim 9 is expanded by the reverse rotation of the hub cap and gear and the fork lock 16 again seats in the gear 11 effectively locking the said gear and the wheel against relative rotative movement.

From the foregoing description taken in connection with the accompanying drawings, it will be apparent that a rim for automobile wheels is provided which will fulfill all the necessary requirements of such a device, but as many changes could be made in the above description and many apparently widely different embodiments of my invention constructed within the scope of the appended claims without departing from the spirit or scope thereof, it is intended that all matters contained in the said accompanying specification and drawings shall be interpreted as illustrative and not in a limited sense.

What I claim as new is:—

1. In combination with a U-shaped felloe, a radially expandible rim composed of sections.

2. In combination with a U-shaped felloe, a concentric sectional rim expandible radially therein.

3. In combination with a U-shaped felloe, a sectional rim held against lateral displacement thereby and means for radially expanding said rim.

4. In combination with a wheel having a hub, spokes and U-shaped felloe, a sectional rim concentric with said felloe and prevented from lateral displacement thereby, and inwardly directed arms for supporting said rim.

5. In combination with a wheel having a hub, spokes and U-shaped felloe, a rim composed of radial expansible segments concentric with said felloe and arms for supporting said rim extending inwardly from each of said segments.

6. An axial rotatable gear, racked arms tangentially meshing therewith and a sectional rim concentric with said felloe and prevented from lateral displacement thereby supported by said arms.

7. The combination with a wheel having a hub, spokes and a U-shaped felloe, of an axial gear, radially extendible arms with racked inner ends meshing tangentially with said gear and a concentric rim formed of overlapping sections held from lateral displacement by the walls of said felloe, with the centre of each of which sections one of said radially extendible arms connects.

8. The combination with a wheel having a hub, spokes and a U-shaped felloe, of an axial gear, a hub cap mounted thereon, means for locking said gear against rotation with respect to said wheel, radially extendible arms with racked inner ends meshing tangentially with said gear and a concentric rim formed of overlapping sections held from lateral displacement by the walls of said felloe, with the centre of each of which sections one of said radially extendible arms connects.

9. The combination with a wheel having a hub, spokes and a U-shaped felloe, of an axial gear, a hub cap threaded thereto, a spring depressed manually releasable lock for holding said gear against rotation with respect to said wheel, radially extendible arms with racked inner ends meshing tangentially with said gear and a concentric rim formed of overlapping sections held from lateral displacement by the walls of said felloe, with the centre of each of which sections one of said radially extendible arms connects.

10. A wheel comprising a hub, spokes and felloe, the latter being U-shaped in cross-section, a rotatable gear axially mounted in said hub, a hub cap threaded thereto, a releasable, spring actuated bolt for holding said gear against rotation with respect to said wheel, a concentric tire carrying rim composed of a plurality of individual overlapping sections prevented from lateral displacement by the walls of said felloe, and supports for said sections formed integral therewith and extending inwardly from centrally thereof, tangentially meshing with said gear being reciprocal radially on the rotation thereof, substantially as described.

In testimony whereof I hereunto affix my signature.

RUSSELL J. REANEY.